United States Patent [19]
Dinur

[11] Patent Number: 5,820,028
[45] Date of Patent: Oct. 13, 1998

[54] IRRIGATION APPARATUS

[75] Inventor: Eldad Dinur, Kibbutz Naan, Israel

[73] Assignee: Naan Irrigation Systems, Kibbutz, Israel

[21] Appl. No.: 430,379

[22] Filed: Apr. 28, 1995

Related U.S. Application Data

[63] Continuation-in-part of Ser. No. 280,147, filed as PCT/US95/05387, Apr. 25, 1995, Pat. No. 5,443,212, which is a continuation of Ser. No. 187,807, Jan. 27, 1994, abandoned, which is a continuation of Ser. No. 21,484, Feb. 23, 1993, abandoned.

[30] Foreign Application Priority Data

| Feb. 26, 1992 | [IL] | Israel | 101071 |
|---|---|---|---|
| Feb. 23, 1993 | [ES] | Spain | 930035610 |
| Feb. 25, 1993 | [FR] | France | 93 02147 |
| Feb. 25, 1993 | [GR] | Greece | 930100069 |
| Feb. 25, 1993 | [IT] | Italy | MI93A0367 |
| Apr. 29, 1994 | [IL] | Israel | 109486 |

[51] Int. Cl.$^6$ ................................................. B05B 15/00
[52] U.S. Cl. ................................................. 239/542; 239/571
[58] Field of Search .................... 239/542, 570, 239/571

[56] References Cited

U.S. PATENT DOCUMENTS

| 3,282,171 | 11/1966 | Tuckmantel | 92/99 |
|---|---|---|---|
| 3,926,375 | 12/1975 | Reeder et al. | 239/542 |
| 3,976,250 | 8/1976 | Bentzinger . | |
| 4,058,257 | 11/1977 | Spencer . | |
| 4,307,841 | 12/1981 | Mehoudar et al. . | |
| 4,369,923 | 1/1983 | Bron | 239/542 |
| 4,382,549 | 5/1983 | Christy et al. | 239/106 |
| 4,405,084 | 9/1983 | Georgiev et al. . | |
| 4,613,080 | 9/1986 | Benson et al. | 239/542 |
| 4,702,280 | 10/1987 | Zakai et al. . | |
| 4,817,875 | 4/1989 | Karmeli et al. | 239/542 |
| 4,850,531 | 7/1989 | Littleton | 239/1 |
| 5,137,216 | 8/1992 | Hanish | 239/542 |
| 5,279,462 | 1/1994 | Mehoudar | 239/542 |
| 5,443,212 | 8/1995 | Dinur | 239/542 |

FOREIGN PATENT DOCUMENTS

| 40918/72 | 10/1973 | Australia . | |
|---|---|---|---|
| 65283/74 | 8/1975 | Australia . | |
| 37128/78 | 7/1980 | Australia . | |
| 51408/79 | 2/1981 | Australia . | |
| 80775/82 | 2/1982 | Australia . | |
| 2550470 | 2/1985 | France . | |
| 2614557 | 11/1988 | France | 239/542 |
| 854326 | 8/1981 | U.S.S.R. | 239/542 |
| 1653648 | 6/1991 | U.S.S.R. | 239/542 |
| WO 83/0004 | 1/1983 | WIPO . | |

OTHER PUBLICATIONS

McGraw–Hill Encyclopedia of Science and Technology, p. 194.

*Primary Examiner*—Kevin Weldon
*Attorney, Agent, or Firm*—Baker & Botts, L.L.P.

[57] ABSTRACT

An irrigation device including an inlet receiving water under pressure, a water collection and releasing mechanism coupled to the inlet for collecting a quantity of water and subsequently releasing at least part of the quantity of water to the atmosphere, said water collection and releasing mechanism comprising a compressible diaphragm, and flow control apparatus governing the supply of water from said inlet to said water collection and releasing mechanism.

20 Claims, 17 Drawing Sheets

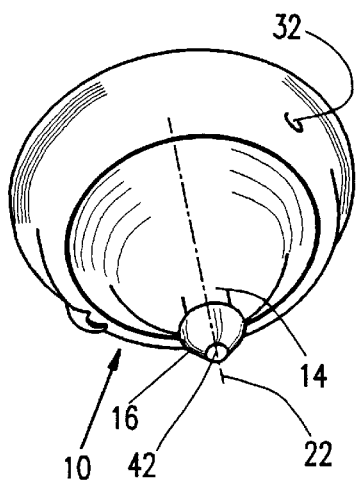
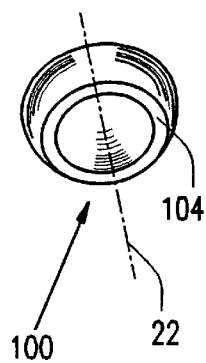
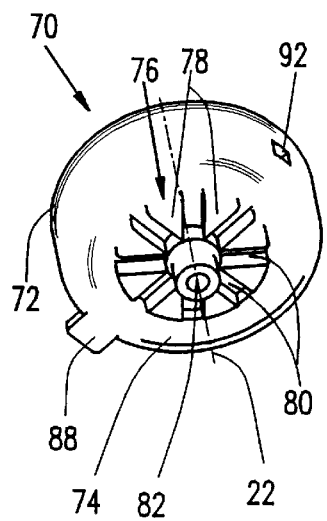
FIG. 2A  FIG. 2B  FIG. 2C
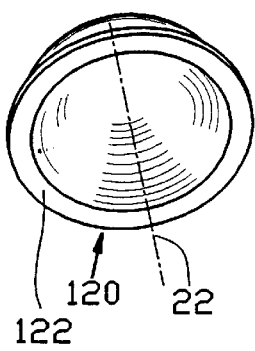
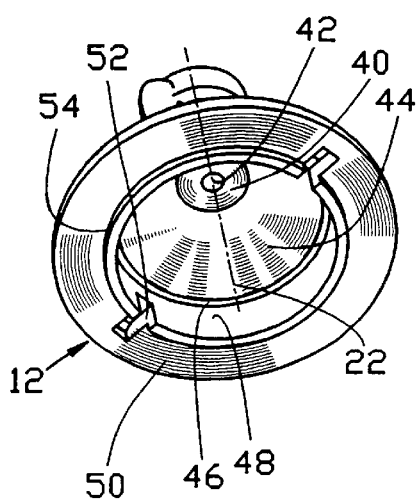
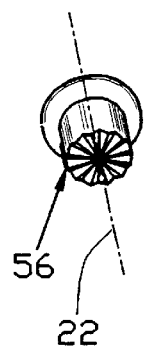
FIG. 2D  FIG. 2E  FIG. 2F

IRRIGATION APPARATUS

This application is a continuation-in-part of application Ser. No. 08/280,147 filed Jul. 25, 1994 now U.S. Pat. No. 5,443,212 which in turn is a continuation of application Ser. No. 08/187,807 filed Jan. 27, 1994 (now abandoned), which in turn is a continuation of application Ser. No. 08/021,484 filed Feb. 23, 1993 (now abandoned). This application is a continuation-in-part also of International application No. PCT/US95/05387 filed Apr. 25, 1995.

FIELD OF THE INVENTION

The present invention relates to drip irrigation emitters generally and more particularly to pulsating type irrigation apparatus.

BACKGROUND OF THE INVENTION

Various types of pulsating type irrigation devices are known in the patent literature. The following U.S. and foreign Patents are believed to represent the current state of the art:

U.S. Pat. Nos. 3,693,888; 3,788,544; 3,802,462; 3,882,892; 3,938,552; 3,976,250; 4,105,162; 4,161,291; 4,176,791; 4,423,838; 4,428,397; 4,519,546; 4,540,125; 4,623,094; 4,655,397; 4,687,143; 4,718,608; 4,728,042; 4,781,217; 4,796,660; 4,889,154; 4,949,747; 4,955,539; 5,132,208; 5,249,745; 5,279,462; 5,294,058; 5,295,506.

Soviet Union Patent Abstracts 854,326; 1,083,790; 1,219,011; 1,240,392; 1,400,551; 1,553,036.

South African Patent 82/5327.

French Patent Abstract 2,614,557.

In recent years pressure compensated drip irrigation emitters have come into widespread use since they enable generally uniform irrigation outputs notwithstanding certain variations in input pressure and thus expand the range of applications of such emitters.

Conventional pressure compensated drip irrigation emitters are capable of providing acceptable output uniformity over a limited input pressure range. This limitation greatly limits the application possibilities available for such emitters.

SUMMARY OF THE INVENTION

The present invention seeks to provide an improved pressure-compensated drip irrigation emitter.

The present invention seeks to provide a pressure compensated dripper which is operative to provide an output quantity having acceptable uniformity over a significantly greater range of input pressures than prior art pressure compensated drippers.

There is thus provided in accordance with a preferred embodiment of the present invention drip irrigation apparatus including a housing, a water inlet and a water outlet and a water flow path extending therebetween being defined in the housing, and a pressure responsive membrane disposed within the housing and arranged to govern the flow of water and wherein the orientation of the pressure responsive membrane is responsive to the pressure of the water impinging on the membrane at a plurality of different mutually spaced locations on the membrane.

Additionally in accordance with a preferred embodiment of the present invention, at the plurality of different mutually spaced locations on the membrane, the water communicates with different mutually spaced locations along the water flow path and is at different pressures.

Further in accordance with a preferred embodiment of the present invention, the membrane is cup-shaped and has a normally convex dome-shaped central portion having two principal positions, a first center-up position in which the central portion of the membrane seals the water inlet, and a second center-down position in which the central portion of the membrane is inverted and cooperates with the housing to modulate the quantity of water flowing through the water flow path.

Additionally in accordance with a preferred embodiment of the present invention, when the membrane is in its second position, i.e. during normal dripper operation, the precise orientation of the membrane and thus its modulation of the quantity of water flowing is affected by impingement of water on the membrane at at least two different mutually spaced locations on the membrane.

In accordance with a preferred embodiment of the present invention, the drip irrigation apparatus is operative to provide flow uniformity of approximately 10% over an input pressure range of between 1–8 Atm.

There is also provided in accordance with a preferred embodiment of the present invention an irrigation device including:

an inlet receiving water under pressure;

a water collection and releasing mechanism coupled to the inlet for collecting a quantity of water and subsequently releasing at least part of the quantity of water to the atmosphere, the water collection and releasing mechanism comprising a compressible diaphragm; and flow control apparatus governing the supply of water from the inlet to the water collection and releasing mechanism.

Preferably the flow control apparatus is operative for generally maintaining a given flow rate of water to the water collection and releasing mechanism notwithstanding variations in the pressure of the water at the inlet.

In accordance with a preferred embodiment of the present invention the flow control apparatus includes a flow control diaphragm which does not permit ingress of water to the water collection and releasing mechanism when the pressure of the water at the inlet is less than a predetermined pressure.

Preferably, the collection and releasing mechanism includes an opening and said flow control apparatus comprises a flow control diaphragm which is initially spaced from the opening and in response to a pressure buildup initially at least partially blocks the opening and only thereafter permits the flow of water from the inlet to the opening.

Further in accordance with a preferred embodiment of the present invention there is provided an irrigation device comprising:

an inlet receiving water under pressure;

a water collection and releasing mechanism coupled to the inlet for collecting a quantity of water and subsequently releasing at least part of the quantity of water to the atmosphere; and flow control apparatus governing the supply of water from the inlet to the water collection and releasing mechanism and wherein the collection and releasing mechanism includes an opening and the flow control apparatus comprises a flow control diaphragm which is initially spaced from the opening and in response to a pressure buildup initially at least partially blocks the opening and only thereafter permits the flow of water from the inlet to the opening.

Additionally in accordance with a preferred embodiment of the present invention, the collection and releasing mechanism includes an outlet aperture and the flow control apparatus includes a flow control diaphragm which is initially spaced from the outlet aperture and is operative to intermittently be spaced from the outlet aperture so as to permit impurities to be flushed from the region of the outlet aperture.

Preferably, the collection and releasing mechanism includes a housing and the flow control apparatus includes a diaphragm which is disposed adjacent an inner surface of the housing and defines with the inner surface of the housing a water inlet passageway, the flow control diaphragm being operative to be further spaced from the inner surface upon blockage of the passageway so as to permit impurities to be flushed from the passageway.

Additionally in accordance with a preferred embodiment of the present invention there is provided an irrigation device including:

an inlet receiving water under pressure; and a water collection and releasing mechanism coupled to the inlet for collecting a quantity of water and subsequently releasing at least part of the quantity of water to the atmosphere, the water collection and releasing mechanism including a water outlet and a water collection and release diaphragm which when at rest seals the water outlet and which is periodically compressed by water received under pressure via the inlet and at least partially collapsed, thereby unsealing the water outlet, such that the potential energy of the compressed and collapsed diaphragm forces water out through the water outlet.

Preferably, the water collection and releasing mechanism includes a water outlet and a water collection and release diaphragm which when at rest seals the water outlet and which is periodically compressed by water received under pressure via the inlet and at least partially collapsed, thereby unsealing the water outlet, such that the potential energy of the compressed and collapsed diaphragm forces water out through the water outlet.

In accordance with a preferred embodiment of the present invention compression of the water collection and release diaphragm causes sudden at least partial collapse thereof.

Preferably, compression of the water collection and release diaphragm causes sudden unsealing of the water outlet.

In accordance with a preferred embodiment of the present invention, the at least partial collapse causes the water collection and release diaphragm to be separated from the water outlet by a distance sufficient to allow outflow of water through the water outlet substantially unimpeded by any particulate matter present adjacent the outlet.

Preferably, the at least partial collapse causes the water collection and release diaphragm to be separated from the water outlet by a distance greater than the smallest dimension of the water outlet.

There is also provided a drip irrigation device including:

a housing defining an inlet receiving water under pressure and an outlet;

flow control apparatus governing the supply of water from the inlet to the outlet, the flow control apparatus including:

a flow control diaphragm which is initially spaced from the outlet and in response to a pressure buildup initially at least partially blocks the outlet and thereafter permits the flow of water from the inlet to the outlet.

Preferably the flow control diaphragm is operative to be spaced from the housing upon blockage of a passageway therebetween so as to permit impurities to be flushed from the passageway.

Further in accordance with a preferred embodiment of the present invention there is provided a drip irrigation device including:

a housing defining an inlet receiving water under pressure and an outlet;

flow control apparatus governing the supply of water from the inlet to the outlet, the flow control apparatus including:

a flow control diaphragm operative to be spaced from the housing upon blockage of a passageway therebetween so as to permit impurities to be flushed from the passageway.

In accordance with a preferred embodiment of the present invention there is also provided a drip irrigation device comprising:

a drip irrigation pipe;

a plurality of drip irrigation assemblies fixed to the interior of the drip irrigation pipe at predetermined intervals, each of the drip irrigation assemblies comprising:

a housing having a water inlet communicating with the interior of the drip irrigation pipe and an outlet communicating with an outlet aperture formed in the drip irrigation pipe; and a diaphragm disposed in the housing and having at least two operative orientations, including a non-pressurized operative orientation wherein the diaphragm is generally convex and a pressurized operative orientation wherein a radially outer portion of the diaphragm is generally convex and a radially inner portion of the diaphragm is generally concave.

Preferably, when the diaphragm is in the pressurized operative orientation it lies adjacent the outlet and is operative to provide pressure responsive flow control of water passing through the outlet.

In accordance with a preferred embodiment of the present invention, when the diaphragm is in the non-pressurized operative orientation it is operative to seal the water inlet until the water pressure within the irrigation pipe exceeds the water pressure downstream of the diaphragm by a predetermined amount.

Preferably the diaphragm operates in the non-pressurized operative orientation as a back-flow preventive valve.

In accordance with a preferred embodiment of the present invention, the housing comprises an outer member and an inner member seated within a recess formed in the outer member, the inner member and the outer member each being sealed to the interior of the pipe, thereby defining a seal between the inner member and the outer member.

There is also provided in accordance with a preferred embodiment of the present invention a method for producing drip irrigation apparatus which includes an irrigation pipe and a plurality of drip irrigation assemblies fixed to the interior of the drip irrigation pipe at predetermined intervals and wherein each of the drip irrigation assemblies comprises a housing including an outer member and an inner member seated within a recess formed in the outer member, the method comprising:

joining but not sealing together the inner member and the outer member; and subsequently heat sealing both the inner member and the outer member to the interior of the drip irrigation pipe, thereby providing a seal between the inner member and the outer member.

BRIEF DESCRIPTION OF THE DRAWINGS

The present invention will be understood and appreciated more fully from the following detailed description, taken in conjunction with the drawings in which:

FIGS. 2A, 2B, 2C, 2D, 2E, and 2F together define an exploded view illustration of the irrigation apparatus of the present invention taken along a direction generally opposite to the direction along which FIGS. 1A–1F are taken;

DETAILED DESCRIPTION OF A PREFERRED EMBODIMENT

Figure 1A:
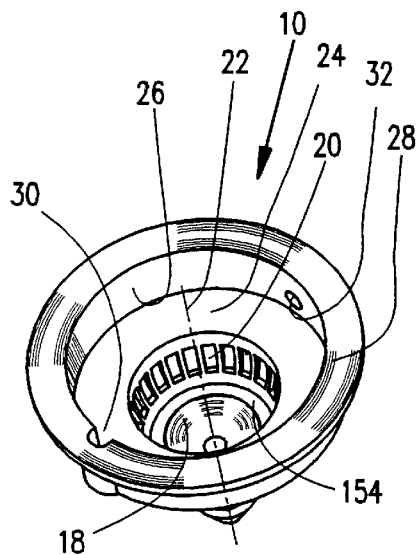
FIGS. 1A, 1B, 1C, 1D, 1E and 1F together define an exploded view illustration of the irrigation apparatus of the present invention taken along one direction.
Figure 1B:
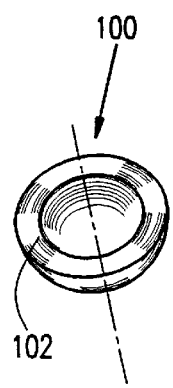
Figure 1C:
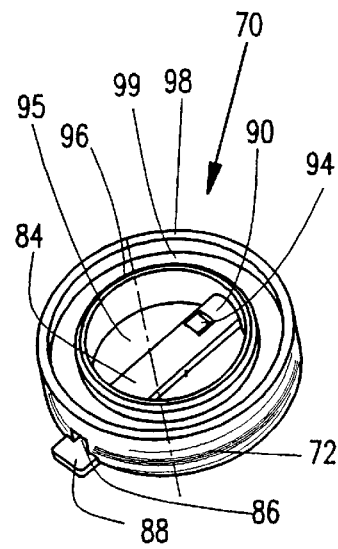
Figure 1D:
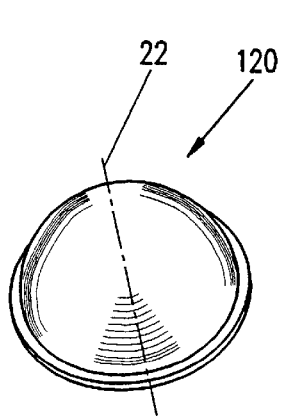
Figure 1E:
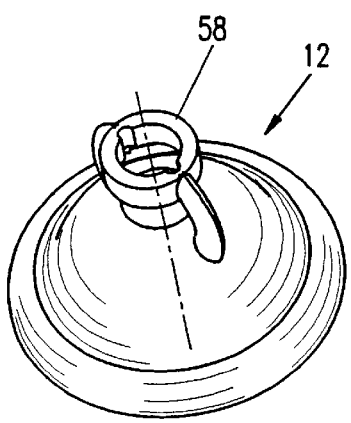
Figure 1F:
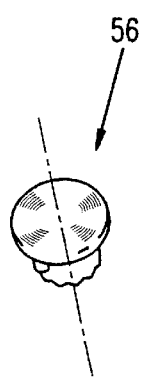

Reference is now made to FIGS. 1A–3I and particularly to FIGS. 1A–1F and 2A–2F, which are exploded view illustrations of the irrigation apparatus of the present invention taken along generally opposite directions. As seen in FIGS. 1A–1F and 2A–2F, the irrigation apparatus of the present invention comprises a two part housing assembly including a water inlet portion 10 and a water outlet portion 12, which are preferably removably held together by a rotatable clamp arrangement (not shown).

The water inlet portion 10 comprises a generally longitudinal water inlet conduit portion 14 having a symmetric generally conical forward retaining configuration, indicated at reference numeral 16. Conduit 14 is preferably integrally formed with and communicates with the interior of a generally hemispherical bowl portion 18, the interior of which is formed with a peripheral array of grooves 20, which extend generally symmetrically about a longitudinal axis 22, along which conduit 14 is centered. Alternatively, only a single groove 20 may be provided.

At the mouth of bowl portion 18, the ends of the peripheral array of grooves 20 are surrounded by a generally circular shoulder 24, which lies generally in a plane perpendicular to longitudinal axis 22. An annular wall portion 26 surrounds shoulder 24 and extends to a further circular shoulder 28, which defines a mouth of the water inlet portion. Annular wall portion 26 is formed with a recess 30, which extends from shoulder 26 to shoulder 28 and defines a water conduit.

Facing recess 30 and disposed on an opposite side of annular wall portion 26 is a air relief aperture 32.

The water outlet portion 12 comprises a generally circular water outlet portion 40 having a central outlet aperture 42 which is preferably arranged to lie along longitudinal axis 22, when the irrigation apparatus is assembled. Outlet portion 40 is preferably integrally formed with and communicates with the interior of a generally hemispherical bowl portion 44. Portion 44 extends generally symmetrically about longitudinal axis 22 and terminates at a generally circular shoulder 46, which lies generally in a plane perpendicular to longitudinal axis 22.

An annular wall portion 48 surrounds shoulder 46 and extends beyond a further circular shoulder 50, which defines a mouth of the water outlet portion. When the irrigation apparatus is assembled, shoulder 50 of water outlet portion 12 lies against and in sealing engagement with shoulder 28 of water inlet portion 10. Shoulder 50 is formed with at least one and preferably a pair of recesses 52 which lie in opposite facing relationship. One of the recesses 52 lies in communication with recess 30, when the irrigation apparatus is assembled. Recesses 52 also cut through the protruding portion of the annular wall portion 48 which protrudes beyond shoulder 50, and which is indicated by reference numeral 54.

Considering the external configuration of the water outlet portion 12, it is seen that disposed in spaced facing relationship with aperture 42 is a flow deflector 56, which is retained by a retaining bridge 58, preferably integrally formed with the outlet portion 12. The flow deflector 56 is normally not integrally formed with the outlet portion 12, so as to enable various flow deflectors 56 to be selectably employed in a modular manner.

Disposed mainly inside water inlet portion 10 is an intermediate member 70. Intermediate member 70 is of generally disk-like configuration and includes an annular generally circular cylindrical peripheral surface 72 and a planar surface 74. Arranged on planar surface 74 is a generally circular array 76 of mutually spaced protrusions 78 of generally uniform height, and preferably of generally triangular configuration. The spacings between protrusions 78 in array 76 preferably define radially directed water conduits 80 which permit water flow radially inward.

Disposed centrally of peripheral surface 72, and along longitudinal axis 22, when the irrigation apparatus is assembled, is a water inlet conduit 82 which extends outwardly of planar surface 74 beyond protrusions 78. Water inlet conduit 82 communicates via a transverse conduit 84 with a water outlet aperture 86 formed in peripheral wall surface 72. Disposed adjacent water outlet aperture 86 is a positioning protrusion 88 which is arranged to seat in recess 30, when the irrigation apparatus is assembled. In this manner aperture 86 is aligned with recess 30, whereby water entering water inlet conduit 82 passes through intermediate member 70 via recess 30 to recess 52.

Intermediate member 70 also defines a second transverse conduit 90, which is sealed from conduit 84 and which communicates via an aperture 92 between air relief aperture 32 in the water inlet portion 10 and the interior of the water outlet portion 12 via an air relief aperture 94.

Intermediate member 70 is formed with an underside surface 95 of intermediate member 70, opposite from planar surface 74 and generally parallel thereto.

Intermediate member 70 defines a pair of concentric annular retaining rings 96 and 98 which extend outwardly from surface 95 and also defines an annular planar surface 99 extending therebetween and lying generally parallel to surface 95.

A first flexible, resilient water impermeable diaphragm 100 is disposed between intermediate member 70 and the water inlet portion 10 of the housing. Its rim, indicated by reference numeral 102, lies against array 76 of protrusions 78. Diaphragm 100 preferably has a peripheral shoulder surface 104. Alternatively, diaphragm 100 is formed without shoulder surface 104.

A second flexible, resilient water impermeable diaphragm 120 is disposed between intermediate member 70 and the water outlet portion 10 of the housing. Its rim, indicated by reference numeral 122, is retained in sealing engagement against surface 99 by rings 96 and 98 and by protruding portion 54.

Reference is now made to FIGS. 3A, 3B, 3C, 3D, 3E, 3F, 3G, 3H and 3I, which are sectional illustrations of the irrigation apparatus of the present invention at various stages of the operation thereof.

Figure 3C:
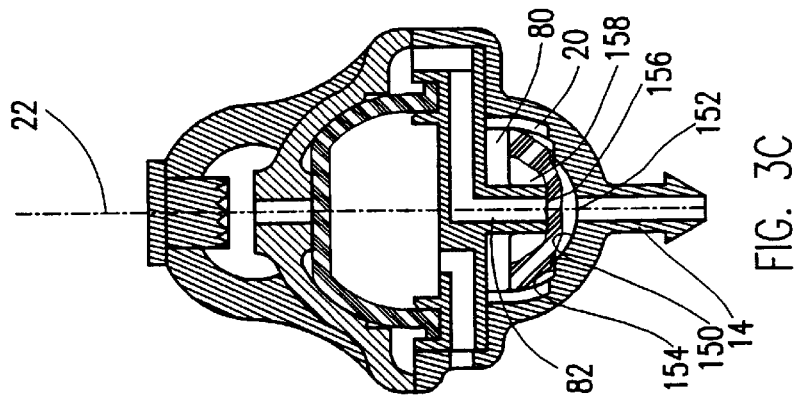
FIGS. 3A, 3B, 3C, 3D, 3E, 3F, 3G, 3H and 3I are sectional illustrations of one embodiment of the irrigation apparatus of the present invention at various stages of the operation thereof.
Figure 3B:
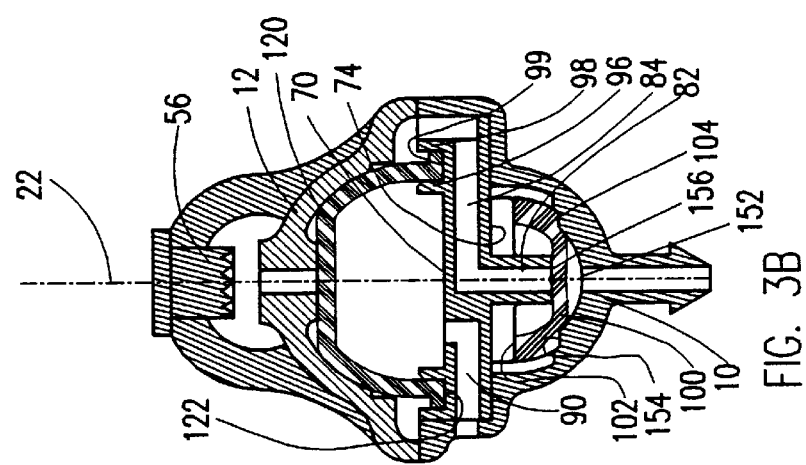
Figure 3A:
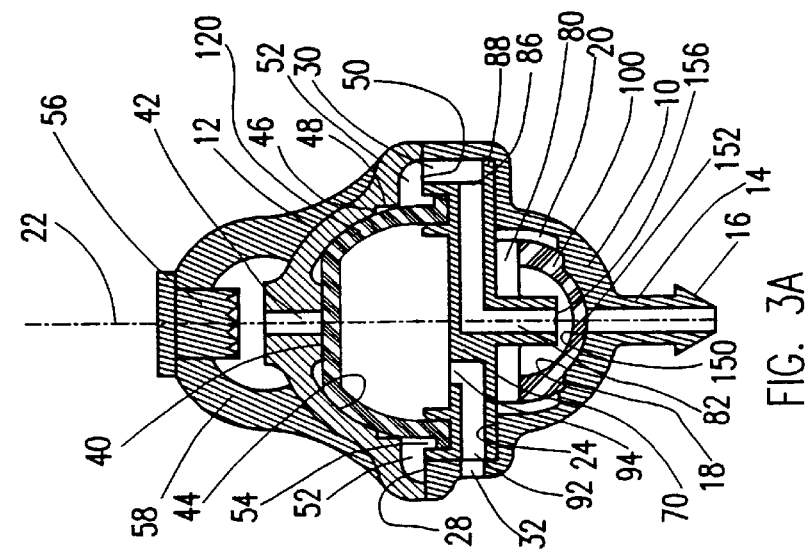

FIG. 3A illustrates the irrigation apparatus of FIGS. 1A–2F at an initial stage of operation wherein the apparatus is not pressurized by water. It is seen that diaphragm 100 lies in sealing engagement with an ungrooved lower portion 150 of bowl portion 18 and seals an aperture 152 via which conduit 14 communicates with the interior of water inlet portion 10.

Upon supply of sufficiently pressurized water via conduit 14 to the irrigation apparatus, diaphragm 100 is initially partially displaced through the orientation shown in FIG. 3B at which aperture 152 is unsealed but the diaphragm 100 lies with shoulder surface 104 in sealing engagement with a peripheral shoulder surface 154 of water inlet portion 10. In the intermediate orientation shown in FIG. 3B, the diaphragm 100 lies against an opening 156 of conduit 82, not necessarily in sealing engagement therewith.

Alternatively, when diaphragm 100 is formed without shoulder surface 104, the water inlet portion 10 may be formed without peripheral shoulder surface 154.

Upon continuing pressurization, the diaphragm 100 reaches the orientation shown in FIG. 3C in which it is no longer in sealing engagement with peripheral shoulder surface 154 and thus partially defines a water flow passage from conduit 14, via grooves 20, radially directed water conduits 80 and opening 156 to conduit 82.

Figure 3D:
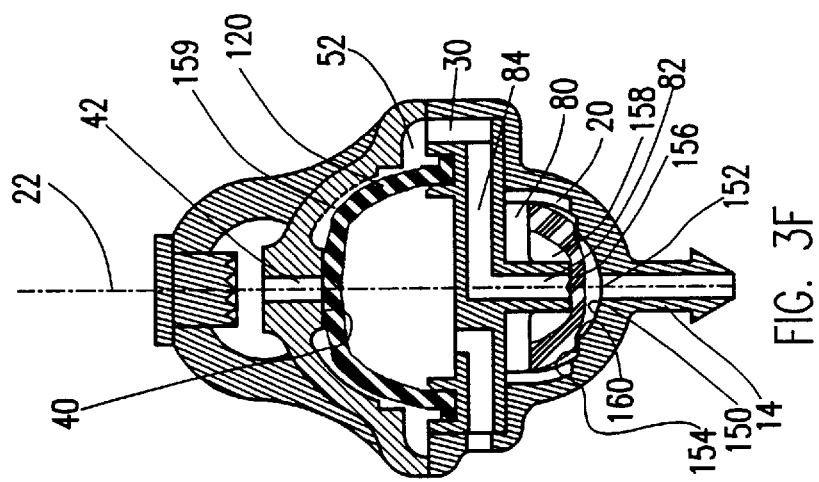
Figure 3E:
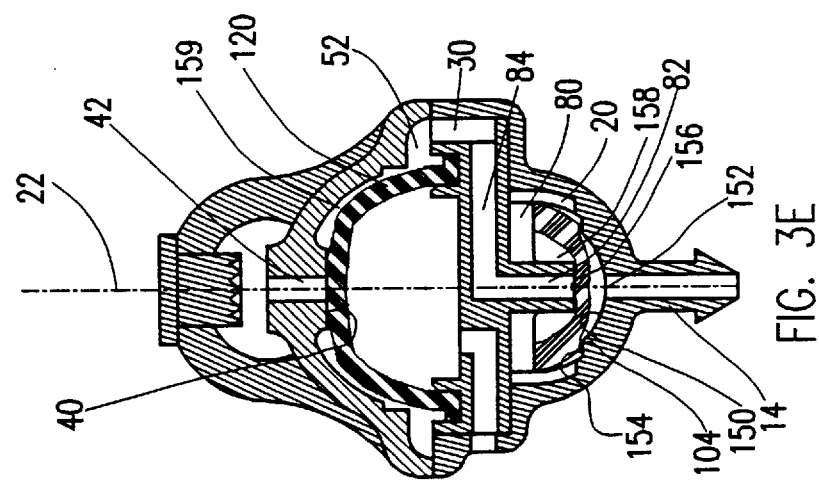

The flow of water into the interior of diaphragm 100, indicated by reference numeral 158, and the consequent filling of the interior causes the diaphragm to be displaced somewhat closer to shoulder surface 154, as seen, for example in FIG. 3D. Water from the interior 158 flows through conduits 82 and 84 and via recesses 30 and 52 into the interior 159 of the water outlet portion 12, exterior of diaphragm 120, and acts to depress diaphragm 120, as shown in FIG. 3E.

During initial supply of water to the irrigation apparatus, the operation of the diaphragm 100 between positions illustrated generally in FIGS. 3C and 3D, provides pressure-responsive flushing of contaminants from the water flow path. This pressure responsive flushing results from an increase in the cross sectional area of the opening between the diaphragm and shoulder surface 154, responsive to a pressure buildup resulting from a blockage of the flow path.

Figure 3F:
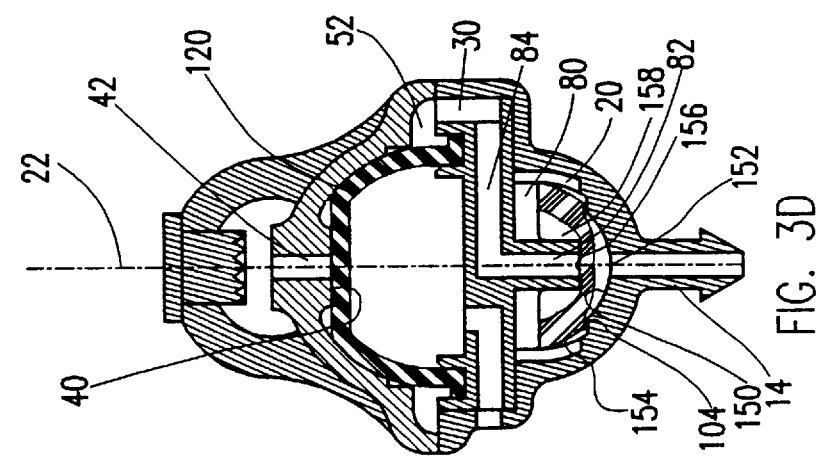
Figure 3I:
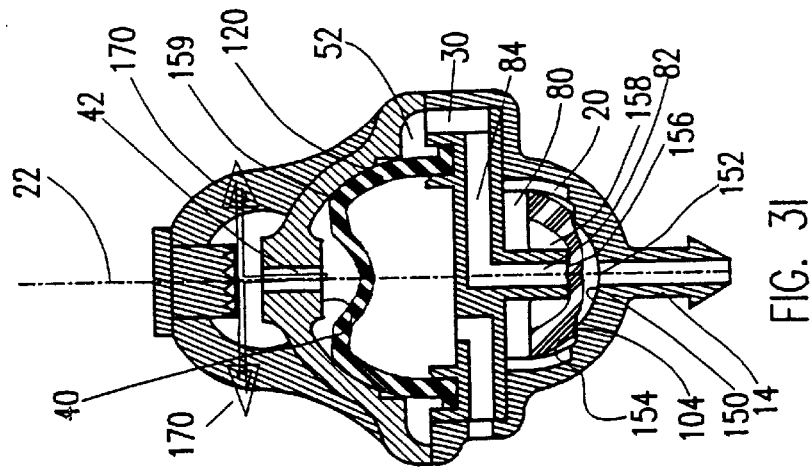
Figure 3H:
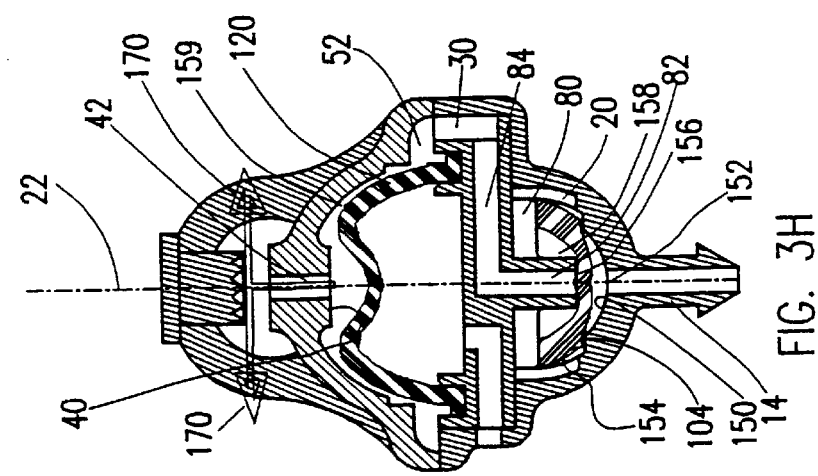
Figure 3G:
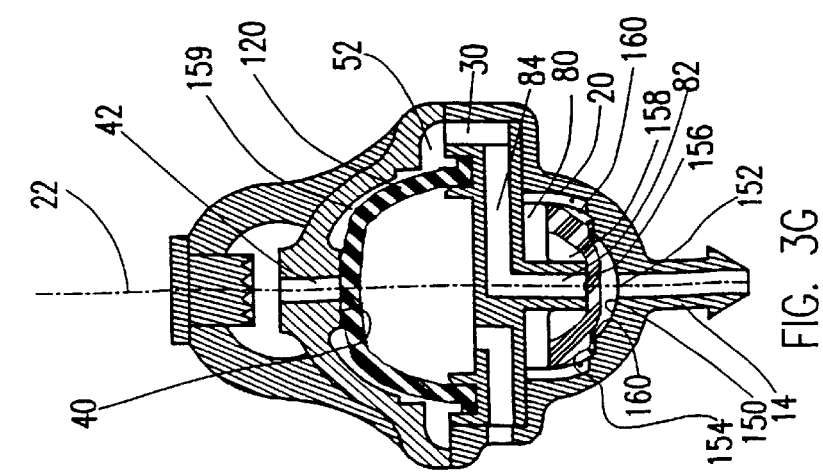

Referring now to FIGS. 3F and 3G, it is seen that if particles of contaminants are present between diaphragm 100 and shoulder surface 154, as shown schematically in FIG. 3F and indicated by reference numeral 160, and the particles cause at least partial blocking of the water path therepast, this blockage lowers the pressure at the interior 158 and cause displacement of the diaphragm 100 away from surface 154, as shown in FIG. 3G, providing a flushing function.

At all stages of operation up to and including that shown in FIG. 3G, diaphragm 120 lies in sealing engagement with central aperture 42 of circular water outlet portion 40. Continued flow of water into the interior 159 causes partial collapse of diaphragm 120, as shown in FIG. 3H and thus opening of central aperture 42. Upon opening of central aperture 42, which occurs suddenly rather than gradually, the potential energy of the partially collapsed diaphragm 120 forces at least part of the water in interior 159 out of the irrigation apparatus via aperture 42, as the diaphragm 120 expands to an orientation shown in FIG. 3I.

As indicated by arrows 170 the water forced out of interior 159 preferably impacts upon flow deflector 56 and is redirected to the outside. As the water is removed from interior 159, the diaphragm 120 eventually returns to its initial state, shown, for example, in FIG. 3D.

Figure 4A:
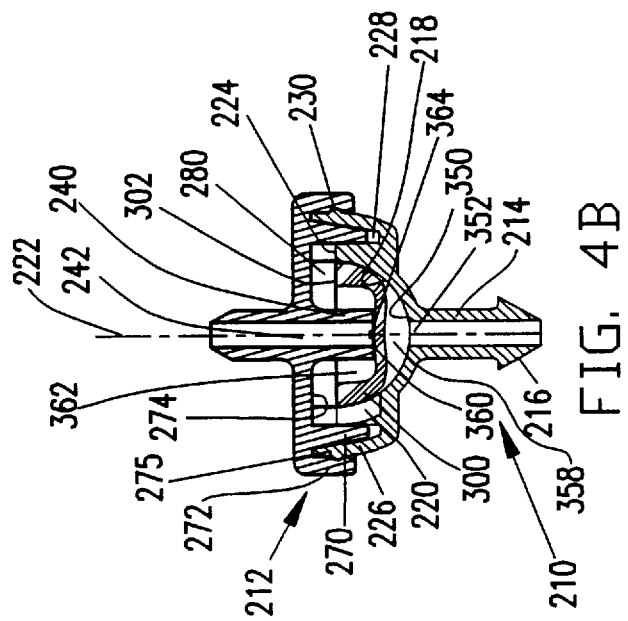
FIGS. 4A and 4B are sectional illustrations of another embodiment of irrigation apparatus of the present invention at two stages of operation thereof.
Figure 4B:
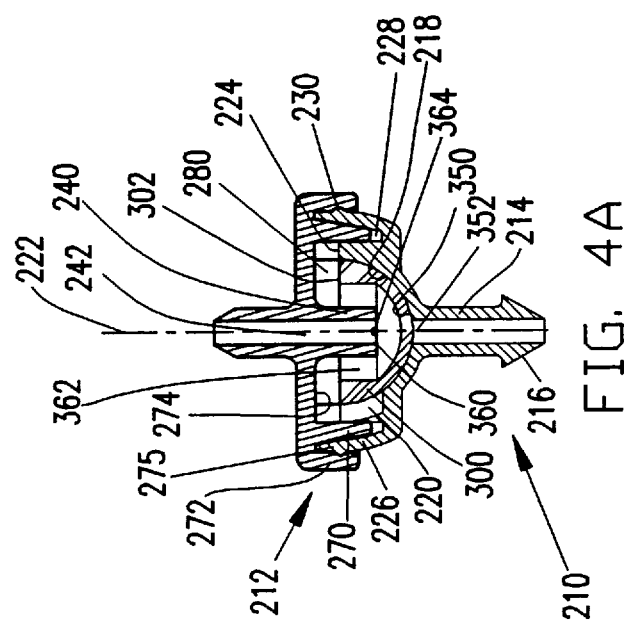
Figure 5:
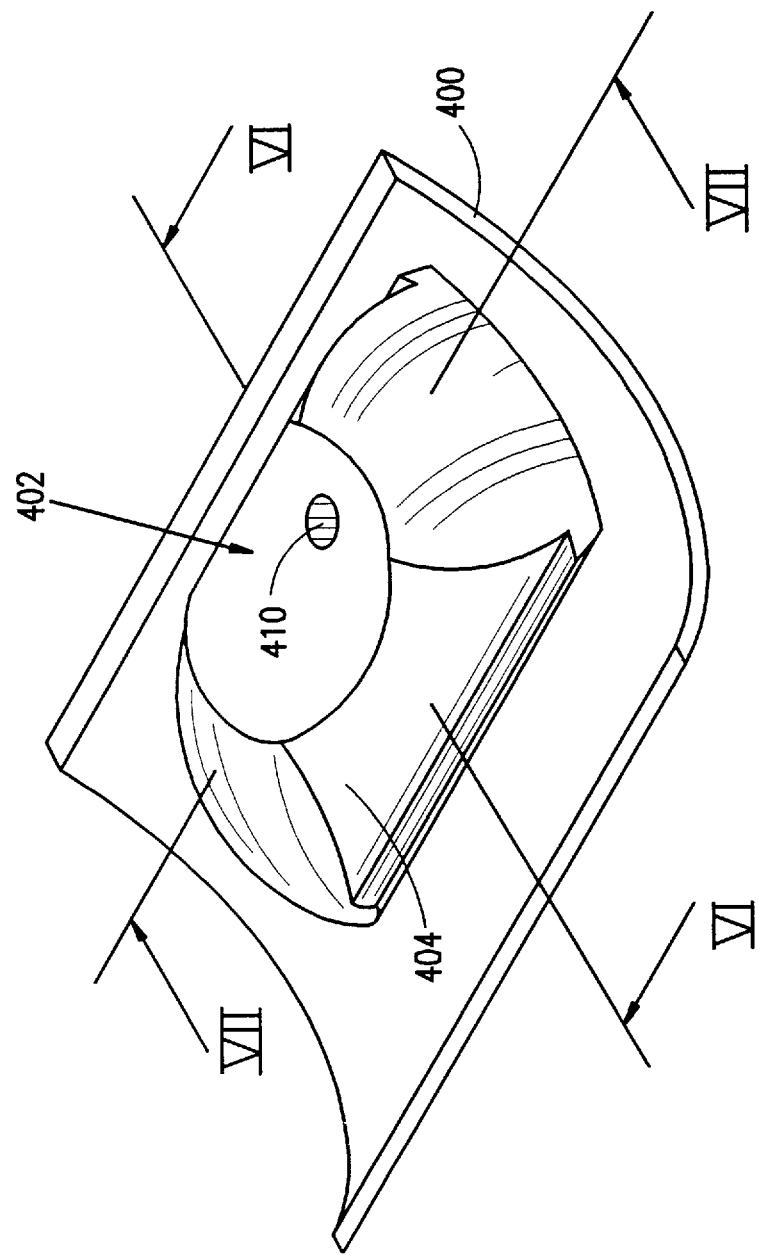
FIG. 5 is a partially cut-away, simplified pictorial illustration of drip irrigation apparatus constructed and operative in accordance with a preferred embodiment of the present invention.

Reference is now made to FIGS. 4A and 4B which are sectional illustrations of another embodiment of irrigation apparatus of the present invention at two stages of operation thereof. The irrigation apparatus of FIGS. 4A and 4B is a dripper which incorporates the principal constructional and operational features of the water inlet portion 10 and diaphragm 100 described above.

As seen in FIGS. 4A and 4B, the irrigation apparatus of the present invention comprises a two part housing assembly including a water inlet portion 210 and a water outlet portion 212, which are preferably removably held together.

The water inlet portion 210 comprises a generally longitudinal water inlet conduit portion 214 having a symmetric generally conical forward retaining configuration, indicated at reference numeral 216. Conduit 214 is preferably integrally formed with and communicates with the interior of a generally hemispherical bowl portion 218, the interior of which is formed with a groove 220.

At the mouth of bowl portion 218, the end of the groove 220 communicates with a generally circular shoulder 224, which lies generally in a plane perpendicular to a longitudinal axis 222. An exterior peripheral wall portion 226 surrounds shoulder 224 in spaced relationship therewith and with respect to bowl portion 218, thus defining a peripheral recess 228. Wall portion 226 is preferably formed with a peripheral protrusion 230 which is employed for coupling, as will be described hereinbelow.

The water outlet portion 212 comprises a generally circular water conduit portion 240 having a central outlet aperture 242 which is preferably arranged to lie along longitudinal axis 222, when the irrigation apparatus is assembled.

Water outlet portion 212 includes mutually spaced inner and outer generally circular cylindrical peripheral walls 270 and 272 and an inner planar surface 274. Walls 270 and 272 define therebetween a generally circular cylindrical peripheral recess 275 which is configured to receive exterior peripheral wall portion 226 for sealed clamping engagement therewith when the dripper is assembled, as shown in FIGS. 4A and 4B. When the dripper is assembled, wall 270 resides within recess 228.

Arranged on planar surface 274 is a generally circular array of mutually spaced protrusions of generally uniform height, and preferably of generally triangular configuration. The spacings between the protrusions in the array preferably define radially directed water conduits 280 which permit water flow radially inward, much in the same way as described hereinabove in connection with the intermediate member 70.

A flexible, resilient water impermeable diaphragm 300 is disposed between water outlet portion 212 and water inlet portion 210 of the housing. Its rim, indicated by reference numeral 302, lies against the array of protrusions described above.

FIG. 4A illustrates the dripper at an initial stage of operation wherein the apparatus is not pressurized by water. It is seen that diaphragm 300 lies in sealing engagement with an ungrooved lower portion 350 of bowl portion 218 and seals an aperture 352 via which conduit 214 communicates with the interior of water inlet portion 210.

Upon supply of sufficiently pressurized water via conduit 214 to the irrigation apparatus, diaphragm 300 reaches the orientation shown in FIG. 4B in which it is no longer in sealing engagement with lower portion 350 and thus partially defines a water flow passage from conduit 214, via groove 220, radially directed water conduits 280 and aperture 242 to the atmosphere.

The flow of water into the volume between lower portion 350 and diaphragm 300, indicated by reference numeral 358, and the consequent filling of this volume causes the diaphragm 300 to be displaced close to the periphery of aperture 242, designated by reference numeral 360, as seen, for example in FIG. 4B.

Water from the volume 358 flows through the space defined between the exterior of diaphragm 300 and lower portion 350 into the interior volume of the diaphragm 300, indicated by reference numeral 362. Water from volume 362 passes into aperture 242 to the extent that it is not sealed by diaphragm 300. Preferably a small slit 364 is formed at the periphery 360 of aperture 242 to ensure a desired flow of water into the aperture.

It is appreciated that pressure responsive flow control of the quantity of water passing into aperture 242 is provided by pressure responsive positioning of diaphragm 300 against periphery 360.

An automatic self-cleaning feature is provided by diaphragm 300, much in the same way as described hereinabove in connection with diaphragm 100.

Reference is now made to FIGS. 5–7B, which illustrate drip irrigation apparatus constructed and operative in accordance with a preferred embodiment of the present invention. The drip irrigation apparatus of the present invention comprises a pipe 400, typically formed of polyethylene by extrusion, interiorly of which are heat welded at predetermined intervals, drip irrigation assemblies 402.

Each drip irrigation assembly 402 preferably comprises an outer portion 404, an inner portion 406 and a diaphragm 408, typically formed of rubber, which is disposed in sealing relationship therebetween.

The outer portion 404 defines a water inlet aperture 410, which communicates with the interior of pipe 400 and receives pressurized irrigation water therefrom. As seen particularly well in FIGS. 6A, 6B, 7A and 7B, water inlet aperture 410 communicates with an interior generally concave volume 412, whose generally concave surface 414 is defined by outer portion 404.

Figure 6A:
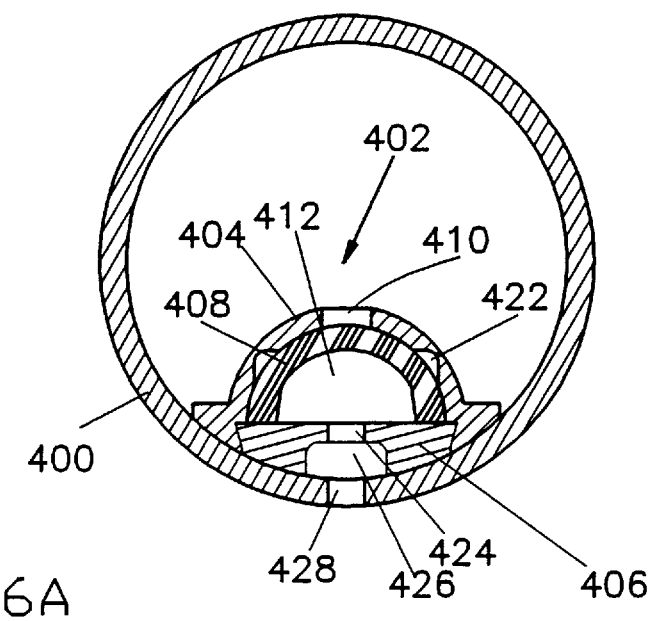
FIGS. 6A and 6B are sectional illustrations taken along lines VI—VI of the drip irrigation apparatus of FIG. 5 in respective unpressurized and pressurized operative orientations.
Figure 7A:
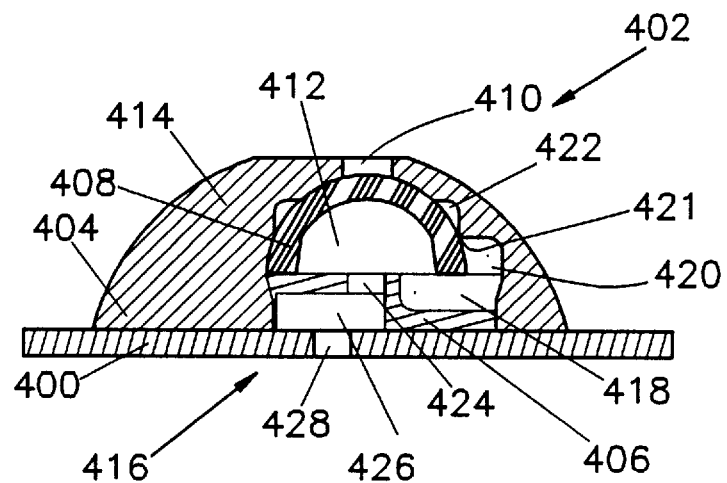
FIGS. 7A and 7B are sectional illustrations taken along lines VII—VII, perpendicular to lines VI—VI, of the drip irrigation apparatus of FIG. 5 in respective unpressurized and pressurized operative orientations.

Membrane 408 is seated within volume 412 and when it is in an unpressurized operative orientation, lies against generally concave surface 414 as seen in FIGS. 6A and 7A.

Inner portion 406 is seated within a recess 416 disposed within outer portion 404 above volume 412. Inner portion 406 includes a passageway 418 which provides communication between a passageway 420, lying adjacent to and communicating with volume 412 outside of diaphragm 408, and the remainder of volume 412 inside of diaphragm 408, as seen particularly in FIGS. 7A and 7B. Disposed below passageway 420, and separated therefrom by a shoulder 421, there may be provided a peripheral, generally ring shaped recess 422, which fully or partially surrounds volume 412.

Inner portion 406 also defines an outlet aperture 424 which communicates between the interior of volume 412, interior of diaphragm 408, and an outlet volume 426. A water exit aperture 428, formed in pipe 400, communicates with outlet volume 426.

It will be appreciated by persons skilled in the art, that when the pressure in the interior of pipe 400 is insufficient to displace diaphragm 408 from its unpressurized orientation, as shown in FIGS. 6A and 7A, substantially no water enters into that portion of volume 412 downstream of diaphragm 408.

Figure 6B:
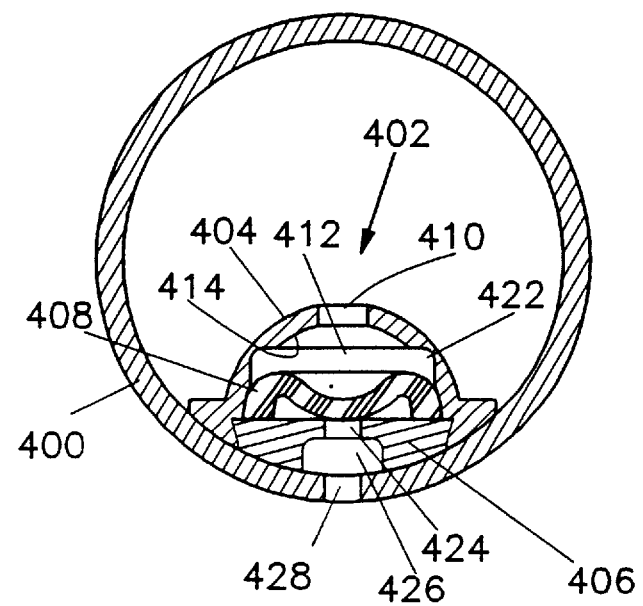
Figure 7B:
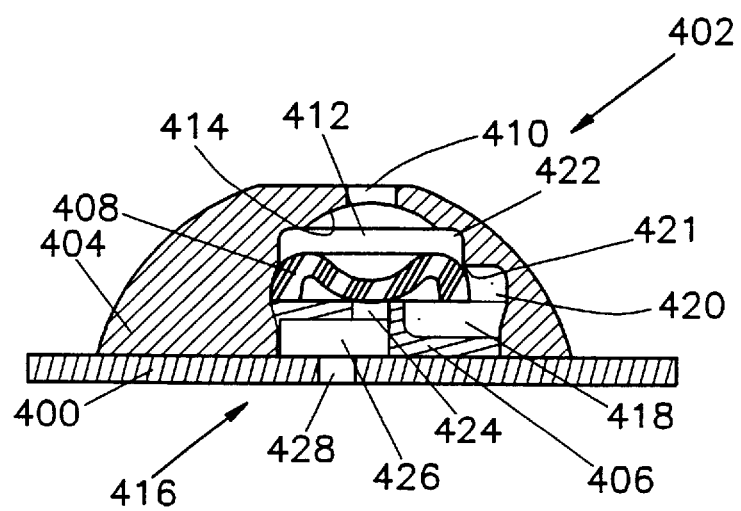
Figure 8A:
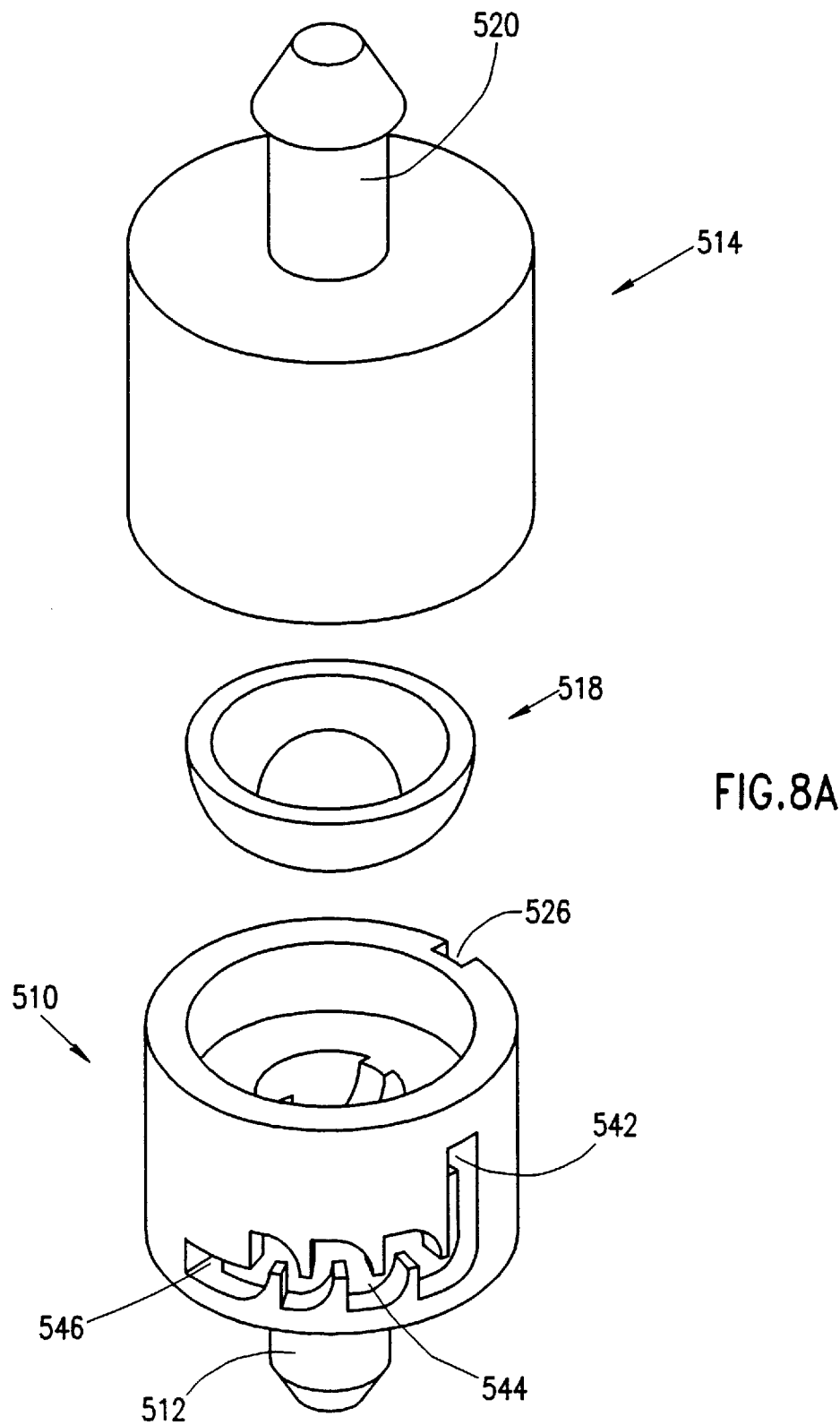
FIGS. 8A and 8B are respective side and sectional exploded view pictorial illustrations of a drip irrigation emitter constructed and operative in accordance with a further preferred embodiment of the present invention.
Figure 8B:
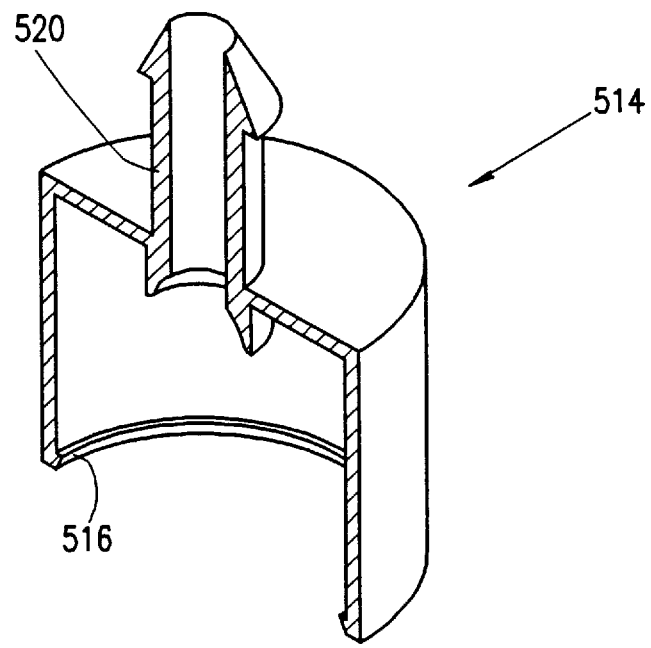
Figure 8B:
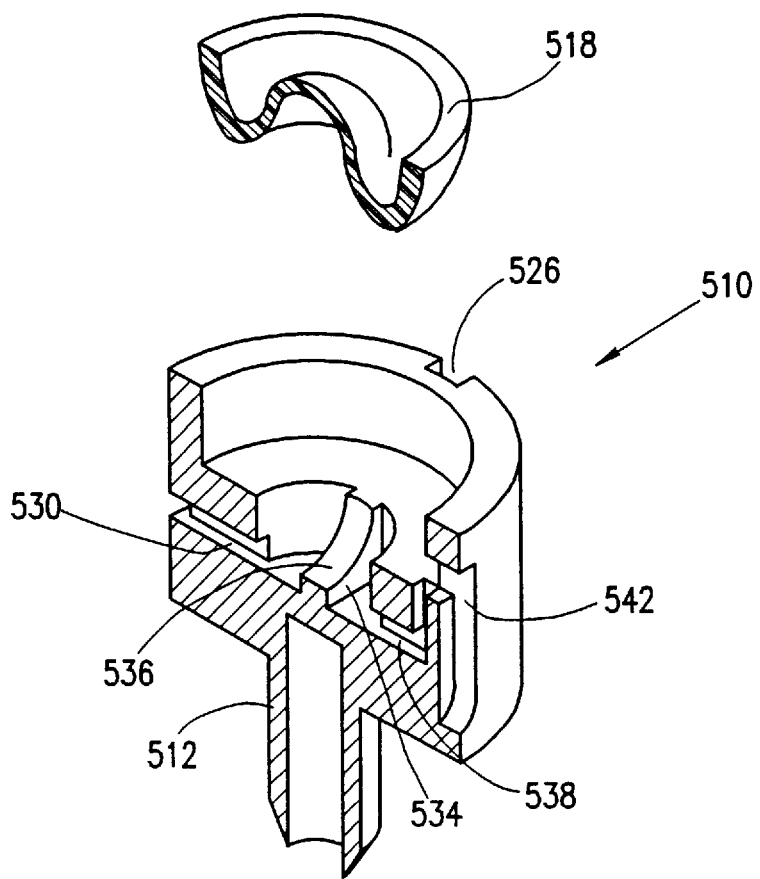
Figure 8C:
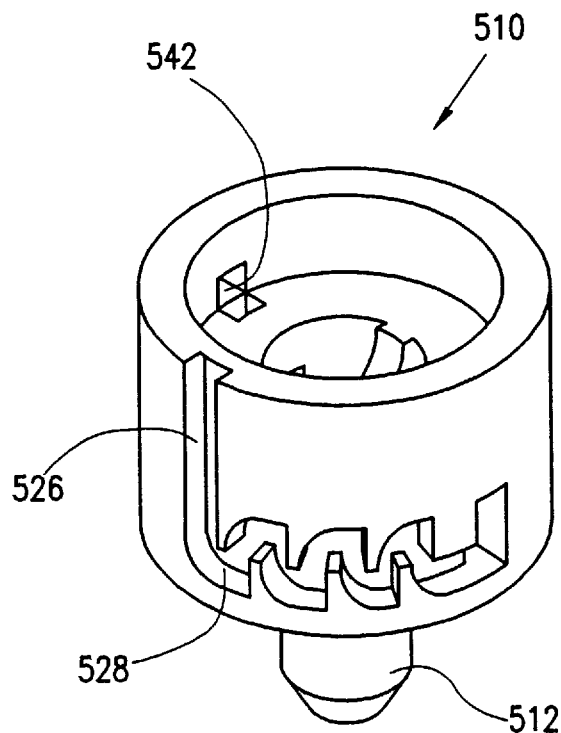
FIG. 8C is a pictorial illustration of part of the emitter of FIG. 8A, rotated by 180 degrees about its overall axis of symmetry.
Figure 9E:
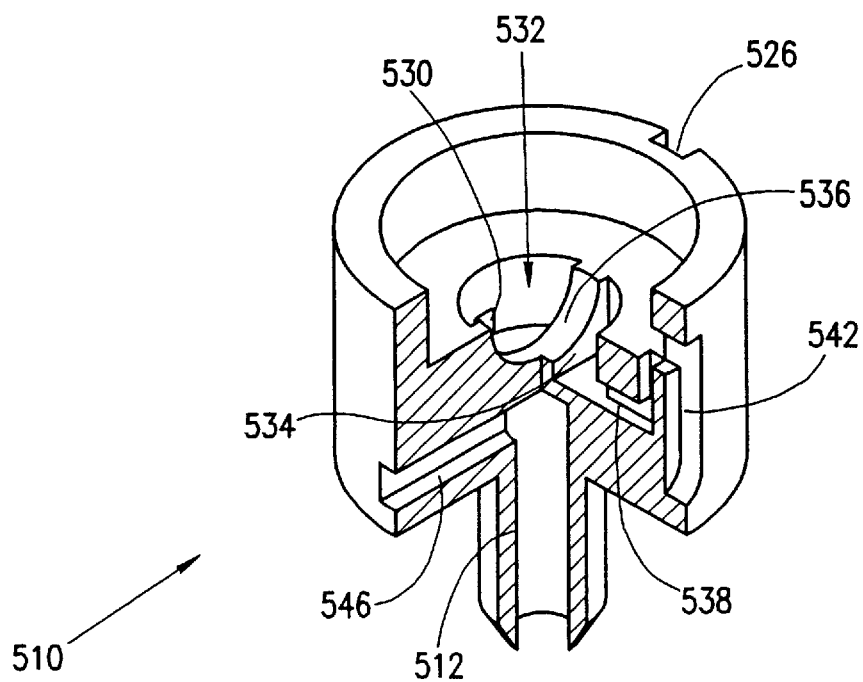
FIG. 9E is a partially sectioned illustration of part of the emitter of FIGS. 8A–9D in the orientation shown in FIG. 9D.
Figure 9B:
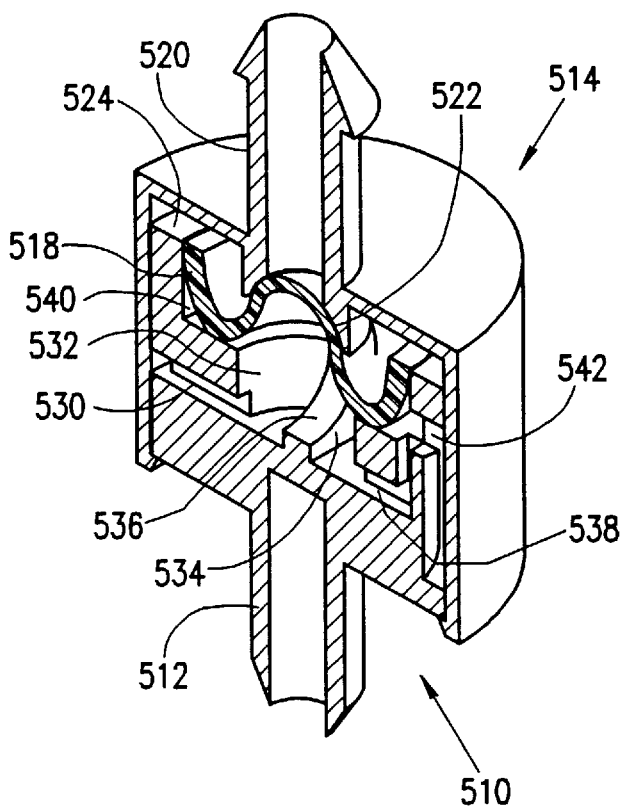
FIGS. 9A and 9B are respective side and sectional pictorial illustrations of the drip irrigation emitter of FIGS. 8A–8C.
Figure 9A:
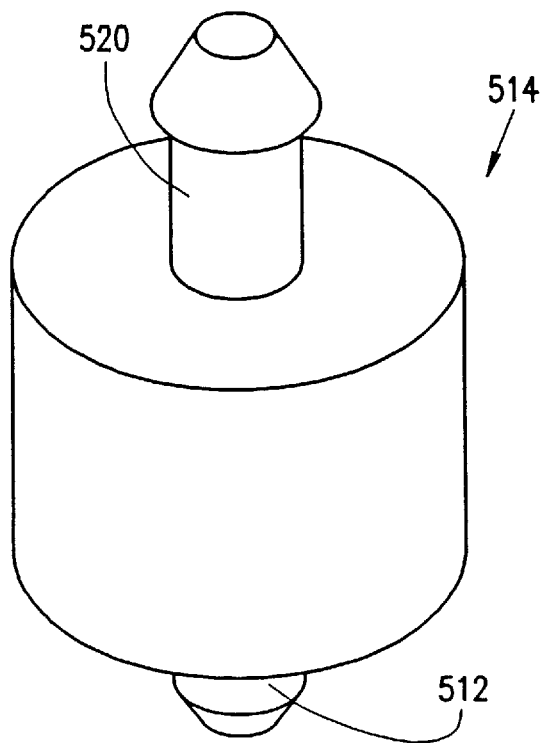
Figure 9C:
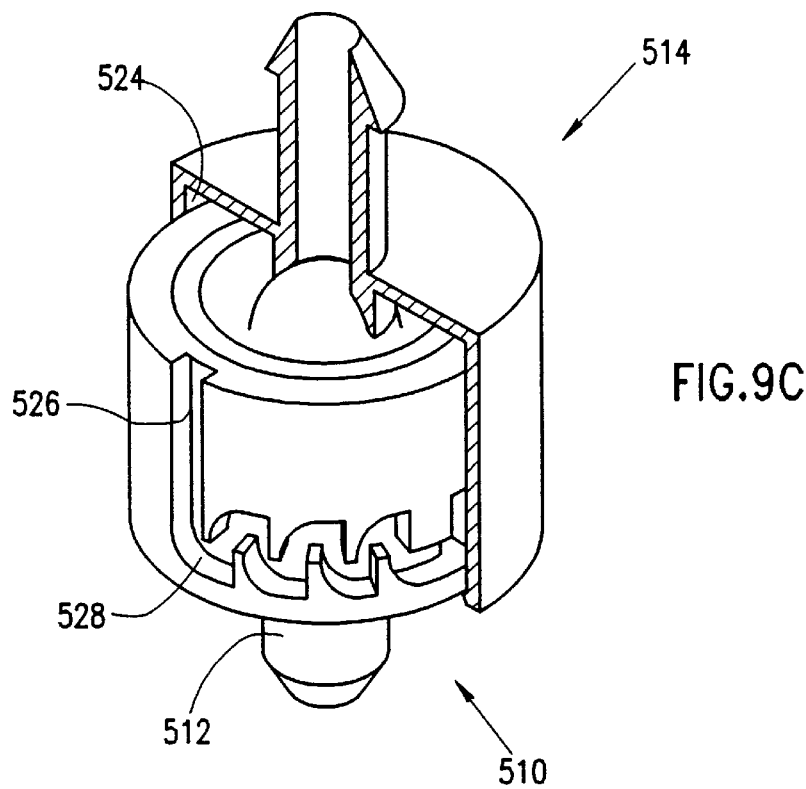
FIGS. 9C and 9D are partially cut away illustrations of the drip irrigation emitter of FIGS. 8A–9B in orientations rotated with respect to each other by 180 degrees about the overall axis of symmetry of the emitter.
Figure 9D:
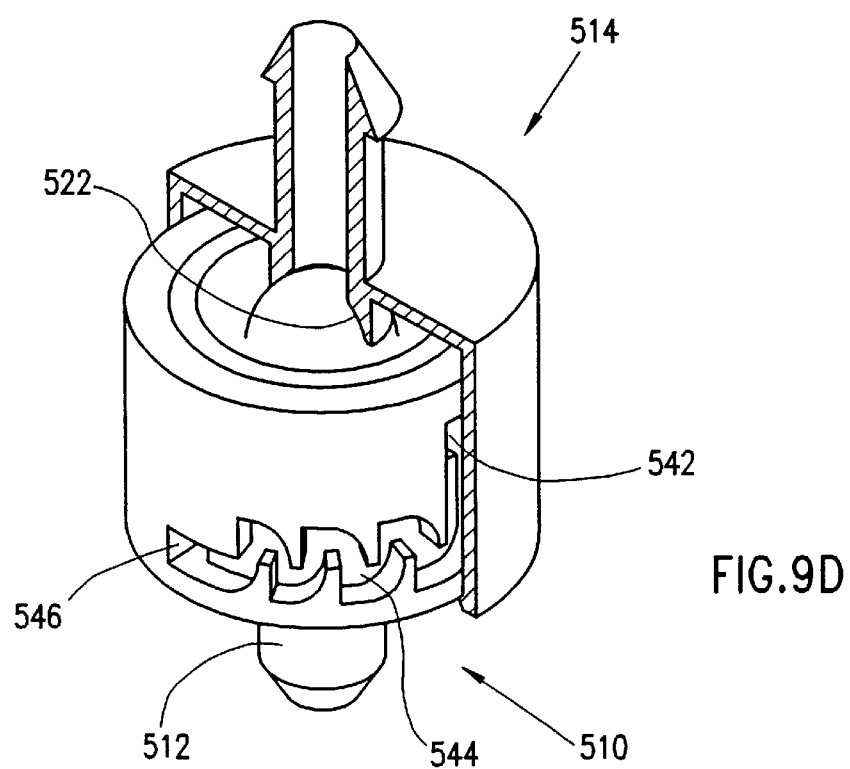

When the pressure in pipe 400 reaches a sufficient level, the diaphragm 408 is displaced to a second operative orientation, illustrated generally in FIGS. 6B and 7B. The position of the diaphragm 408 against a shoulder 421 lying at the junction between volume 412 and passageway 420 may define a pressure reducing, narrow opening through which water passes from the inlet aperture 410 to the outlet aperture 424.

In this orientation, the diaphragm 408 provides pressure responsive flow control. The pressure responsive flow control takes place at the peripheral edge of outlet aperture 424 as a function of the propinquity of the diaphragm 408 thereto, in response to the pressure applied to the diaphragm.

It will be appreciated by persons skilled in the art that the present invention is not limited to what has been particularly shown and described hereinabove. Rather the scope of the present invention is defined only by the claims which follow, which are to be interpreted to include reasonable variations in the embodiments described with particularity.

Reference is now made to FIGS. 8A–11B, which illustrate a pressure compensated drip irrigation emitter constructed and operative in accordance with a preferred embodiment of the present invention. The emitter includes a housing which preferably comprises a base member 510 defining a drip irrigation outlet 512 and a cover member 514 which is arranged for snap fit engagement with the base member 510 via an engagement rim 516. The emitter also includes a membrane 518 which is mounted between the interior of the base member 510 and the cover member 514.

In accordance with a preferred embodiment of the present invention, the membrane 518 is bowl-shaped and has a normally convex dome-shaped central portion which has two principal positions, a first center-up position in which the dome-shaped central portion of the membrane preferably seals a water inlet and a second center-down position, in which the central portion of the membrane is inverted and modulates the quantity of water flowing through a water flow path defined by the membrane and the housing.

Figure 10A:
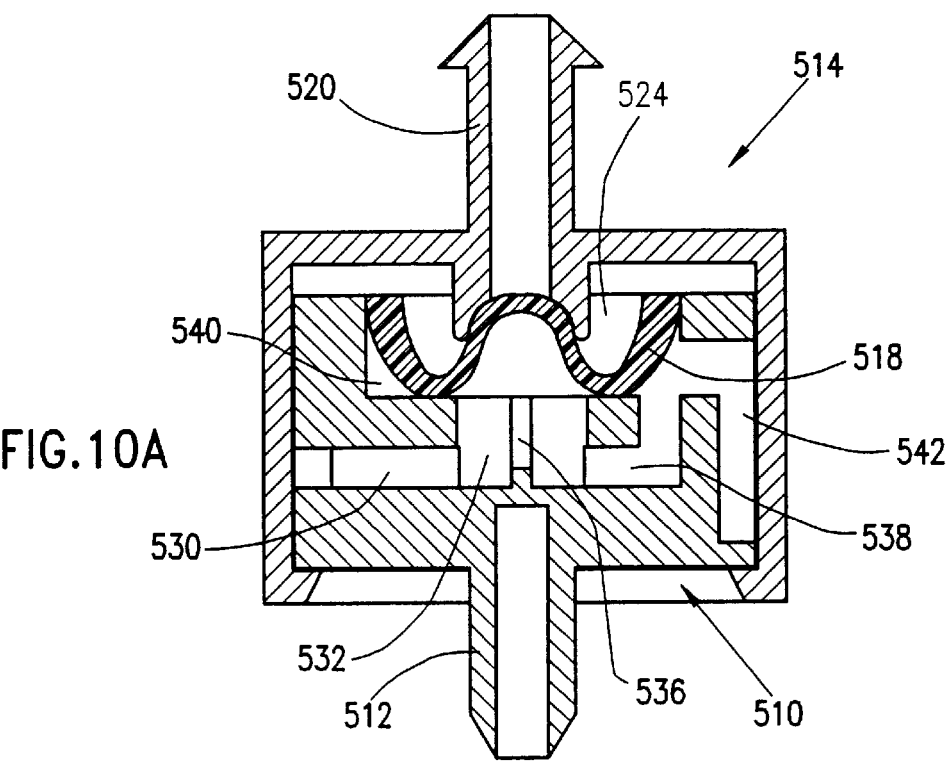
FIGS. 10A, 10B, 10C and 10D are illustrations of four operative orientations of the drip irrigation emitter of FIGS. 8A–9B.

Cover member 514 defines a water inlet 520 which may be configured as shown for insertion into an aperture in a water supply line. Generally speaking, upon initial pressurization of the emitter, pressurized water from the water supply line passes through inlet 520 and forces membrane 518 from its center up position when unpressurized, as shown in FIG. 10A to an intermediate position, shown in FIG. 10B.

Figure 10B:
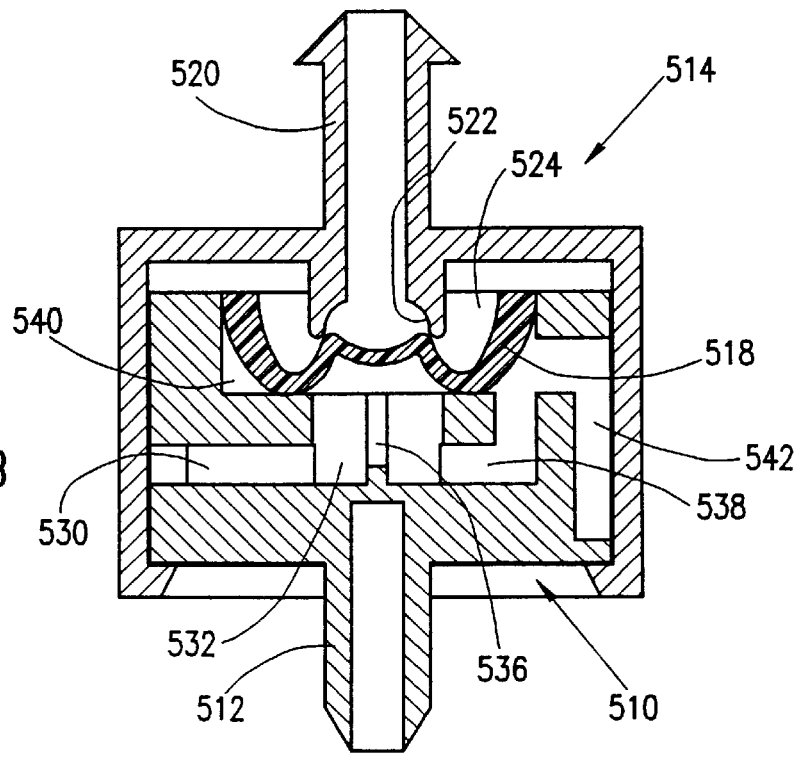

When membrane 518 is in the position shown in FIG. 10B, water from the inlet 520 passes between the membrane and inlet interior wall into a volume 524 above the membrane and from there via a passageway 526, communicating with volume 524 to a pressure reducing pathway 528, which may be of any suitable configuration, such as a configuration described in any of the above-mentioned patents of applicant/assignee.

Figure 11A:
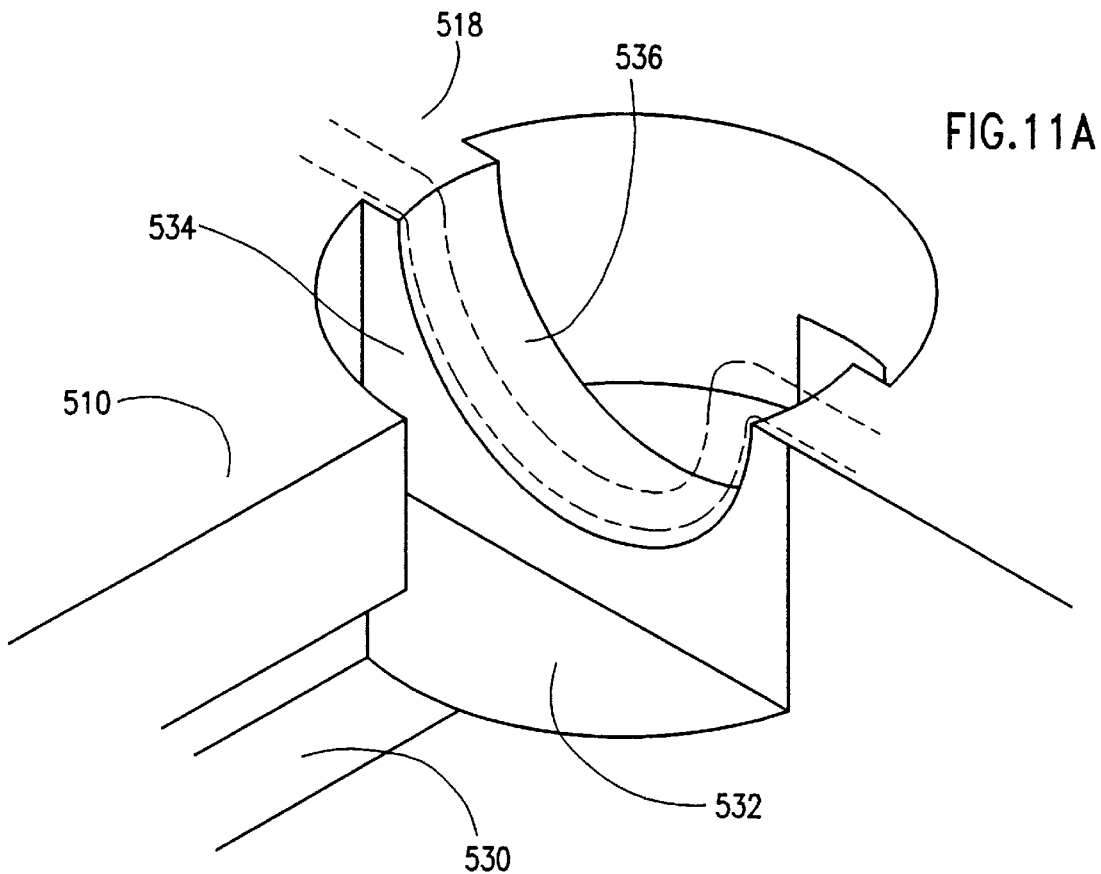
FIGS. 11A and 11B are respective pictorial and sectional illustrations indicating the positioning of the membrane against a curved support in the orientation of FIG. 10D.
Figure 11B:
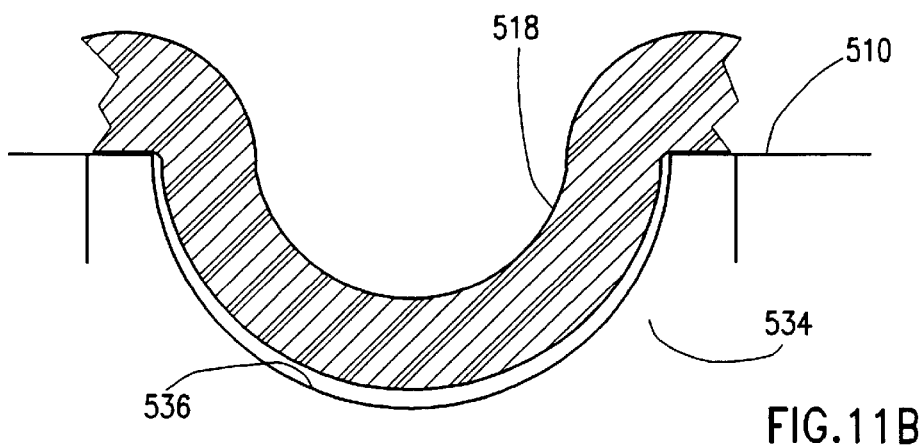

Pathway 528 terminates in a passageway 530 extending generally radially inwardly of base member 510 which communicates with a first side of an inner pressure control volume 532, which is partially and symmetrically bifurcated by a curved membrane engagement wall 534 having a membrane engagement surface 536, as illustrated in detail in FIGS. 11A and 11B.

Water which passes from the first side of volume 532 past wall 534 to the second side enters a passageway 538 which communicates with a volume 540 surrounding membrane 518 at the underside of an intermediate portion thereof. From volume 540, the water passes via a passageway 542 into a second pressure reducing passageway 544, which leads into a passageway 546, which communicates with outlet 512.

The operation of the drip irrigation emitter described above will now be summarized. As noted above, with reference to FIG. 10B, water from inlet 520 passes between the membrane 518 and wall 522 into volume 524. This flow quickly causes the membrane 518 to shift from a "center up" type of position, represented by FIGS. 10A and 10B to a "center down" type of position, represented by FIGS. 10C and 10D.

Figure 10C:
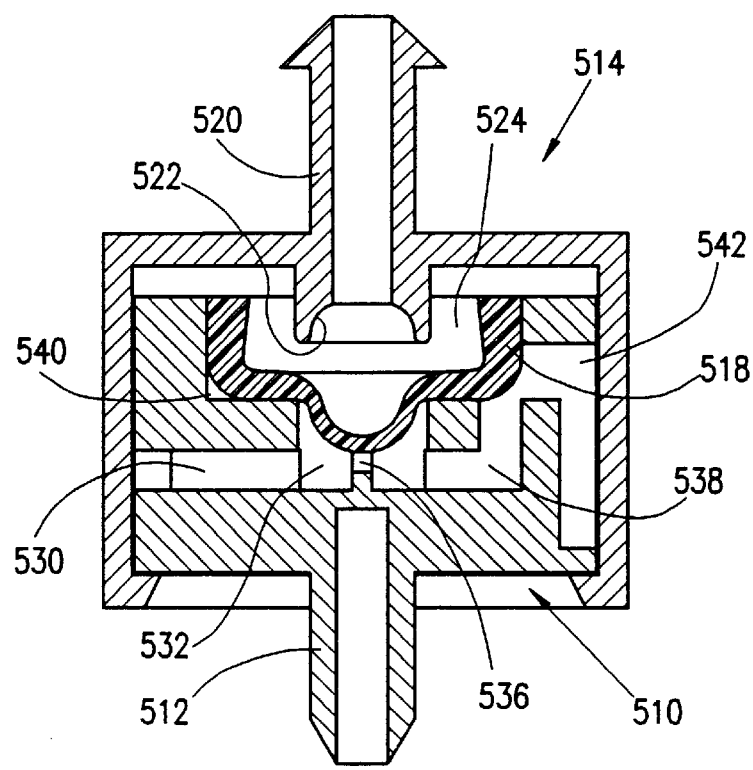
Figure 10D:
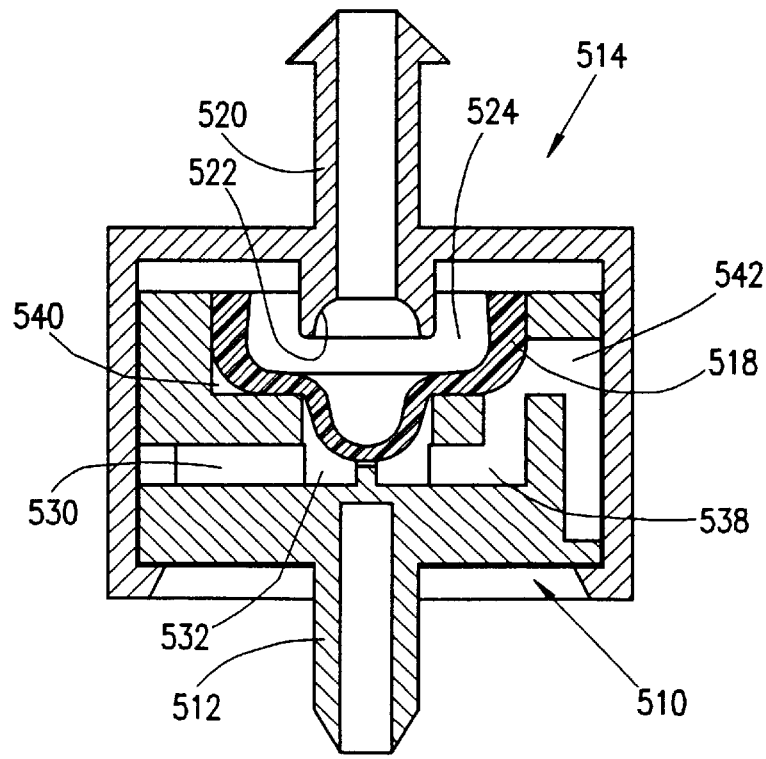

From a consideration of FIGS. 10C and 10D it can be appreciated that when the membrane is in the center-down position, it conforms to and engages surface 536 of the housing and that this engagement between the membrane 518 and the engagement surface 536 provides governance of the flow of water through the emitter. It is also appreciated that the location of membrane 518 at volume 540, and the resulting configuration of membrane 518 thereat, provides further governance of the flow of water through the emitter. It is further appreciated that inward displacement of the membrane 518, from its orientation in FIG. 10C to its orientation in FIG. 10D enables the membrane to be pushed closer towards engagement surface 536.

It is a particular feature of the present invention that beneficial water engagement with the membrane is provided at an additional stage of the water flow through the emitter, as compared with the prior art, thus providing more responsive pressure compensation than in the prior art and as a result, enabling the emitter to provide suitably pressure compensated output rates over a significantly greater range of input pressures.

It will be appreciated by persons skilled in the art that the present invention is not limited by what has been particularly shown and described hereinabove. Rather the scope of the present invention is defined only by the claims which follow:

I claim:

1. A drip irrigation device comprising:

a housing defining an inlet receiving water under pressure and an outlet;

flow control apparatus governing the supply of water from said inlet to said outlet, said flow control apparatus comprising:

a flow control diaphragm which is initially spaced from said outlet and in response to a pressure buildup initially at least partially blocks said outlet and thereafter permits the flow of water from said inlet to said outlet, said diaphragm having first and second operative orientations wherein when pressure on said diaphragm is below a given threshold it is in said first operative orientation wherein it is spaced from said outlet and when said pressure on said diaphragm is above said given threshold it is in said second operative orientation wherein it is spaced from said inlet and defines a pressure reducing opening adjacent said outlet, said diaphragm providing pressure responsive flow control when it is in said second operative orientation, said pressure responsive flow control taking place at a peripheral edge of said outlet as a function of the propinquity of the diaphragm thereto in response to said pressure applied to said diaphragm.

2. A drip irrigation device according to claim 1 and wherein said diaphragm is configured in said first operative orientation to have a general bowl shape, wherein the center of the outside surface of the bowl shape of the diaphragm seals said inlet and wherein said diaphragm is configured in said second operative orientation in a partially collapsed bowl shape, wherein the center of the bowl shape lies adjacent said outlet and the sides of the bowl shape extend beyond the center thereof.

3. A drip irrigation device according to claim 2 and wherein in said first operative orientation said diaphragm blocks said inlet.

4. A drip irrigation device according to claim 2 and wherein said diaphragm has at least one orientation wherein it provides pressure responsive flow control at two locations, said pressure responsive flow control taking place both at a peripheral edge of said outlet as a function of the propinquity of the diaphragm thereto in response to said pressure applied to said diaphragm and also along a pressure reducing passageway through which water passes from said inlet to said outlet as a function of the propinquity of an edge of the diaphragm thereto; and said diaphragm comprises first and second opposite surfaces, said first surface of said diaphragm facing said outlet for providing pressure responsive flow control therewith and said second surface of said diaphragm facing said pressure reducing passageway for providing pressure responsive flow control therewith.

5. A drip irrigation device according to claim 4 and wherein in said first operative orientation said diaphragm blocks said inlet.

6. A drip irrigation device according to claim 1 and wherein in said first operative orientation said diaphragm blocks said inlet.

7. A drip irrigation device according to claim 1 and wherein said diaphragm has at least one orientation wherein it provides pressure responsive flow control at two locations, said pressure responsive flow control taking place both at a peripheral edge of said outlet as a function of the propinquity of the diaphragm thereto in response to said pressure applied to said diaphragm and also along a pressure reducing passageway through which water passes from said inlet to said outlet as a function of the propinquity of an edge of the diaphragm thereto; and said diaphragm comprises first and second opposite surfaces, said first surface of said diaphragm facing said outlet for providing pressure responsive flow control therewith and said second surface of said diaphragm facing said pressure reducing passageway for providing pressure responsive flow control therewith.

8. A drip irrigation device according to claim 7 and wherein in said first operative orientation said diaphragm blocks said inlet.

9. A drip irrigation device comprising:

a housing defining an inlet receiving water under pressure and an outlet;

flow control apparatus governing the supply of water from said inlet to said outlet, said flow control apparatus comprising:

a flow control diaphragm having first and second operative orientations wherein when pressure on said diaphragm is below a given threshold it is in said first operative orientation wherein it is spaced from said outlet and when said pressure on said diaphragm is above said given threshold it is in said second operative orientation wherein it is spaced from said inlet and defines a pressure reducing opening adjacent said outlet, said diaphragm providing pressure responsive flow control when it is in said second operative orientation, said diaphragm being configured in said first operative orientation to have a general bowl shape, wherein the center of the outside surface of the bowl shape of the diaphragm seals said inlet and wherein said diaphragm is configured in said second operative orientation in a partially collapsed bowl shape, wherein the center or the bowl shape lies adjacent said outlet and the sides of the bowl shape extend beyond the center thereof.

10. A drip irrigation device according to claim 9 and wherein said diaphragm has at least one orientation wherein it provides pressure responsive flow control at two locations, said pressure responsive flow control taking place both at a peripheral edge of said outlet as a function of the propinquity of the diaphragm thereto in response to said pressure applied to said diaphragm and also along a pressure reducing passageway through which water passes from said inlet to said outlet as a function of the propinquity of an edge of the diaphragm thereto; and said diaphragm comprises first and second opposite surfaces, said first surface of said diaphragm facing said outlet for providing pressure responsive flow control therewith and said second surface of said diaphragm facing said pressure reducing passageway for providing pressure responsive flow control therewith.

11. A drip irrigation device comprising:

a drip irrigation pipe;

a plurality of drip irrigation assemblies fixed to said drip irrigation pipe at predetermined intervals, each of said drip irrigation assemblies comprising:

a housing having a water inlet communicating with the interior of said drip irrigation pipe and an outlet communicating with an outlet aperture formed in said drip irrigation pipe; and a diaphragm disposed in said housing and having at least two operative orientations, including a non-pressurized operative orientation wherein the diaphragm is generally convex and a pressurized operative orientation wherein a radially outer portion of the diaphragm is generally convex and a radially inner portion of the diaphragm is generally concave, said at least two operative orientations including first and second operative orientations wherein when pressure on said diaphragm is below a given threshold it is in said first operative orientation wherein it is spaced from said outlet and when said pressure on said diaphragm is above said given threshold it is in said second operative orientation wherein it is spaced from said inlet and defines a pressure reducing opening adjacent said outlet, said diaphragm providing pressure responsive flow control when it is in said second operative orientation, said pressure responsive flow control taking place at a peripheral edge of said outlet as a function of the propinquity of the diaphragm thereto in response to said pressure applied to said diaphragm.

12. A drip irrigation device according to claim 11 and wherein in said first operative orientation said diaphragm blocks said inlet.

13. A drip irrigation device according to claim 11 and wherein said diaphragm has at least one orientation wherein it provides pressure responsive flow control at two locations, said pressure responsive flow control taking place both at a peripheral edge of said outlet as a function of the propinquity of the diaphragm thereto in response to said pressure applied to said diaphragm and also along a pressure reducing passageway through which water passes from said inlet to said outlet as a function of the propinquity of an edge of the diaphragm thereto; and said diaphragm comprises first and second opposite surfaces, said first surface of said diaphragm facing said outlet for providing pressure responsive flow control therewith and said second surface of said diaphragm facing said pressure reducing passageway for providing pressure responsive flow control therewith.

14. A drip irrigation device according to claim 13 and wherein in said first operative orientation said diaphragm blocks said inlet.

15. A drip irrigation device comprising:

a housing having a water inlet and a water outlet; and a diaphragm disposed in said housing and having at least one orientation wherein it provides pressure responsive flow control at two locations, said pressure responsive flow control taking place both at a peripheral edge of said outlet as a function of the propinquity of the diaphragm thereto in response to said pressure applied to said diaphragm and also along a pressure reducing passageway through which water passes from said inlet to said outlet as a function of the propinquity of an edge of the diaphragm thereto and wherein said diaphragm comprises first and second opposite surfaces, said first surface of said diaphragm facing said outlet for providing pressure responsive flow control therewith and said second surface of said diaphragm facing said pressure reducing passageway for providing pressure responsive flow control therewith.

16. A drip irrigation device comprising:

a drip irrigation pipe;

a plurality of drip irrigation assemblies fixed to the interior of said drip irrigation pipe at predetermined intervals, each of said drip irrigation assemblies comprising:
  a housing having a water inlet communicating with the interior of said drip irrigation pipe and an outlet communicating with an outlet aperture formed in said drip irrigation pipe; and
  a diaphragm disposed in said housing and having at least two operative orientations, including a non-pressurized operative orientation wherein the diaphragm is generally convex and a pressurized operative orientation wherein a radially outer portion of the diaphragm is generally convex and a radially inner portion of the diaphragm is generally concave.

17. A drip irrigation device according to claim 16 and wherein when said diaphragm is in said pressurized operative orientation it lies adjacent said outlet and is operative to provide pressure responsive flow control of water passing through said outlet.

18. A drip irrigation device according to claim 16 and wherein when said diaphragm is in said non-pressurized operative orientation it is operative to seal said water inlet until the water pressure within said irrigation pipe exceeds the water pressure downstream of said diaphragm by a predetermined amount.

19. A drip irrigation device according to claim 18 and wherein said diaphragm operates in said non-pressurized operative orientation as a back-flow preventive valve.

20. A drip irrigation device according to claim 16 and wherein said housing comprises an outer member and an inner member seated within a recess formed in the outer member, said inner member and said outer member each being sealed to the interior of said pipe, thereby defining a seal between said inner.

* * * * *